United States Patent
Mammarappallil et al.

(10) Patent No.: US 8,265,678 B2
(45) Date of Patent: Sep. 11, 2012

(54) ADAPTIVE APPLICATION DATA PACKAGING TO IMPROVE PACKET EFFICIENCY IN A FIXED FRAME PACKET COMMUNICATION SYSTEM

(75) Inventors: Gigy S. Mammarappallil, Arlington Heights, IL (US); Vivek G. Naik, Deerfield, IL (US)

(73) Assignee: Motorola Mobility LLC, Libertyville, IL (US)

( * ) Notice: Subject to any disclaimer, the term of this patent is extended or adjusted under 35 U.S.C. 154(b) by 706 days.

(21) Appl. No.: 12/267,385

(22) Filed: Nov. 7, 2008

(65) Prior Publication Data
US 2010/0120462 A1   May 13, 2010

(51) Int. Cl.
*H04B 7/00* (2006.01)
(52) U.S. Cl. ........ 455/518; 455/466; 455/62; 455/414.1
(58) Field of Classification Search .................. 455/518, 455/517, 67.11, 455, 452.1, 516, 520, 466, 455/62, 414.1, 414.4; 370/471, 469, 474, 370/318; 375/377
See application file for complete search history.

(56) References Cited

U.S. PATENT DOCUMENTS

2007/0094409 A1 * 4/2007 Crockett et al. ............... 709/233
2008/0175230 A1 * 7/2008 Brand et al. .................. 370/352

OTHER PUBLICATIONS

3RD Generation Partnership Project 2, "Packet Switched Voice (over IP) and Video Telephony Services End-to-End System Design Technical Report", Nov. 2005, 3GPP X.R0039-0, Version 1.0, 25 pages.

* cited by examiner

*Primary Examiner* — John J Lee

(57) ABSTRACT

A method (400) of communicating data and a communication device (104) that communicates data. At least a first portion of the data can be encoded into at least one frame (202, 204, 208, 210) having a first bit length, and encoding at least a second portion of the data into at least one frame (206, 212) having a second bit length. The method also can include placing the at least one frame having the first bit length and the at least one frame having the second bit length into an adaptive data packet (108) having a fixed bit length and a fixed number of frames. The adaptive data packet can be communicated to a communication device (106).

20 Claims, 3 Drawing Sheets

| H/R Frame 202 | H/R Frame 204 | F/R Frame 206 | H/R Frame 208 | H/R Frame 210 | F/R Frame 212 | Unused 216 | Overhead 214 | under the US 8,265,678 B2

ADAPTIVE APPLICATION DATA PACKAGING TO IMPROVE PACKET EFFICIENCY IN A FIXED FRAME PACKET COMMUNICATION SYSTEM

BACKGROUND OF THE INVENTION

1. Field of the Invention

The present invention generally relates to fixed frame communications and, more particularly, to packaging of data for fixed frame communications.

2. Background of the Invention

Push-to-talk (PTT) communications were originally implemented using half-duplex communication systems. However, with the proliferation of cellular communication systems in recent years, PTT communications now are available over a variety of packet based digital communication systems. Examples of packet based digital communication systems include those based on General Packet Radio Services (GPRS), the Universal Mobile Telecommunications System (UTMS), Code Division Multiple Access (CDMA), etc.

Oftentimes, a half-rate enhanced variable rate codec (half-rate EVRC) is used to encode PTT data into frames, which are then packetized for communication over a packet based communication system. For example, when the PTT data is packetized in accordance with the 1x Evolution Data Optimized revision A (DOrA), for example, each data packet contains six (6) half-rate EVRC frames, which are each eighty (80) bits in length. Thus, the total PTT data length of 480 bits. An additional 344 bits is usually allocated for overhead (e.g. headers, footers, etc.), thus providing a total length of 824 bits.

Packet sizes in digital communications typically are binary based. Accordingly, conventional packet sizes are generally limited to values determined by raising the base value of two (2) to a particular power, or exponent. For instance, the C.S0024-A standard proposed for use by the Third Generation Partnership Project 2 (3GPP2) defines data packet sizes that may be used for transmitting a reverse traffic channel packet. A reverse traffic channel is used by a communication device to transmit user-specific traffic or signaling information via an access network. The data packet sizes that are defined in C.S0024-A are $2^8$ (i.e. 256) bits, $2^9$ (i.e. 512) bits, $2^{10}$ (i.e. 1024) bits, $2^{11}$ (i.e. 2048) bits, and $2^{12}$ (i.e. 4096) bits.

In the present example, the total bit length of the DOrA PTT data, which is 824 bits, is too long to entirely fit into a conventional packet that is less than 1024 bits in length. Accordingly, when communicating DOrA PTT data, a 1024 bit packet is typically used, thus leaving two hundred (200) unused bits in each data packet. These unused bits are usually set to a particular value (e.g. zero), and thus represent wasted bandwidth.

SUMMARY OF THE INVENTION

The present invention relates to a method of communicating data. The method can include encoding at least a first portion of the data into at least one frame having a first bit length, and encoding at least a second portion of the data into at least one frame having a second bit length. The method also can include placing the at least one frame having the first bit length and the at least one frame having the second bit length into an adaptive data packet having a fixed bit length and a fixed number of frames. The adaptive data packet can be communicated to a communication device.

The present invention also relates to a communication device comprising a controller. The controller can encode at least a first portion of the data into at least one frame having a first bit length, and encode at least a second portion of the data into at least one frame having a second bit length. The controller also can place the at least one frame having the first bit length and the at least one frame having the second bit length into an adaptive data packet having a fixed bit length and a fixed number of frames. The controller further can output the adaptive data packet.

Yet another embodiment of the present invention can include a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the use of dynamically adaptive data packets that improve packet efficiency in a fixed frame packet communication system. In particular, application data to be communicated, for example push-to-talk (PTT) data, can be communicated in an adaptive data packet. As used herein, an "adaptive data packet" is a packet having a fixed number of bits (i.e. a fixed bit length) and a fixed number of frames, wherein at least two of the frames have different bit lengths. The bit lengths for the respective frames can be selected so that when the plurality of frames is assigned to a particular adaptive data packet, the number of bits unused for the data being communicated is minimized, thereby improving data packaging efficiency. As will be described, the improved data packaging efficiency provided by use of the adaptive data packet can allow audio signals to be communicated that have higher quality than would otherwise be available for a given use of bandwidth. Moreover, additional information can be communicated without using additional bandwidth.

Figures 1, 2:
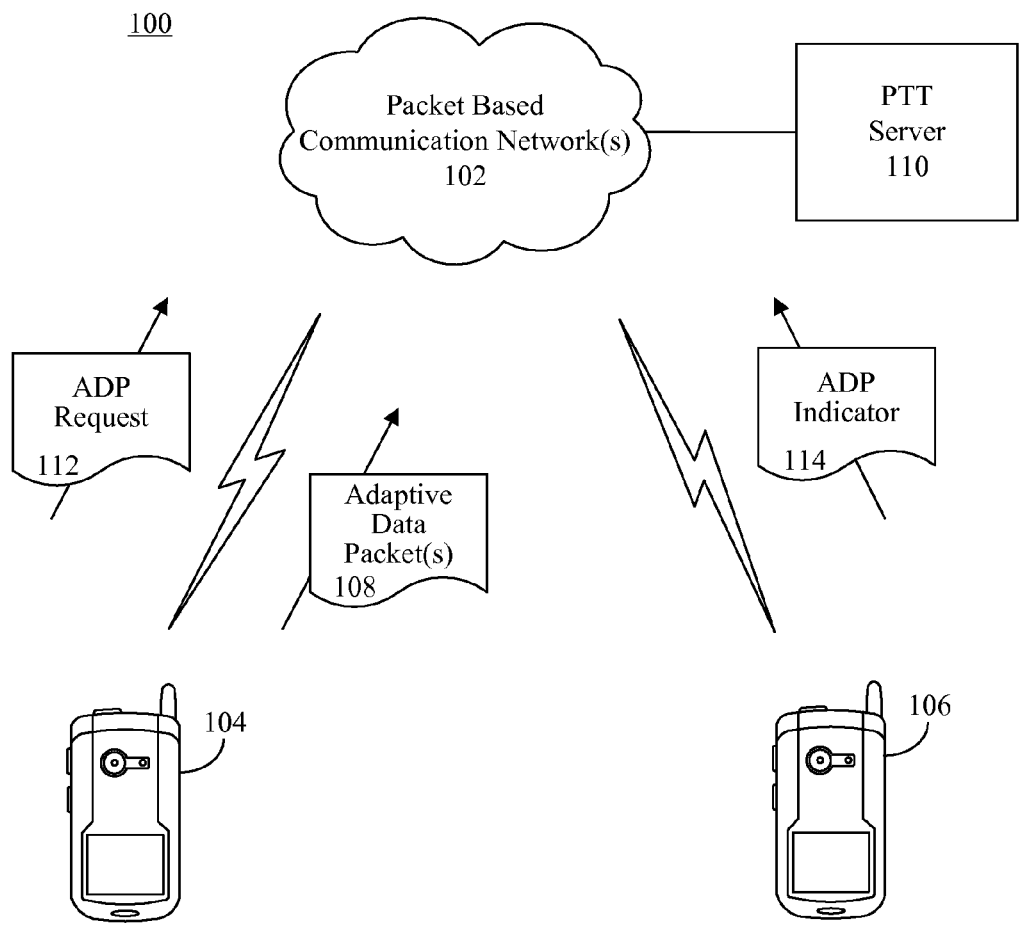
FIG. 1 depicts a communication system that is useful for understanding the present invention.
FIG. 2 depicts an adaptive data packet that is useful for understanding the present invention.

FIG. 1 depicts a communication system 100 that is useful for understanding the present invention. The communication system 100 can include a one or more packet based communication networks 102. Packet based communication networks are well known in the art. Examples of packet based communication networks include, but are not limited to, the Internet, packet switched networks (PSNs), TDMA, CDMA, WCDMA, GSM, GPRS, UTMS, 802.11 and 802.16 (WiMAX), 3G, 4G, EUTRAN, UMB, WPA, WPA2, OFDM, LTE, etc. Still, the invention is not limited in this regard and the communication system 100 can be configured to communicate packets in accordance with any suitable communications standards, protocols, and/or architectures, or a suitable combination of such standards, protocols, and/or architectures.

The communication system 100 also can include a plurality of communication devices 104, 106. The communication devices 104, 106 can be mobile communication devices, for example mobile radios, mobile telephones, personal digital assistants, mobile computers, mobile terminals, application specific devices, stationary communication devices, such as radios or computers, or any other communication devices that can transmit and/or receive packet based communication signals via wired and/or wireless communication links. Two or more of the communication devices can be configured to communicate using adaptive data packets 108, as will be described herein.

In an arrangement in which one or more of the communication devices 104, 106 are push-to-talk (PTT) radios, the communication system also can include a PTT server 110, though this need not be the case. In one arrangement, the PTT server 110 can process PTT communication signals exchanged between the communication devices 104, 106. Alternatively, the communication devices 104, 106 can communicate with one another without the user of the PTT server 110, for example using peer-to-peer communications.

For the purpose of this example, let it be assumed that the communication device 104 is configured to communicate using adaptive data packets 108, and that the communication device 106 has been selected as a terminating communication device to receive data packets from the communication device 104. In this case the communication device may be considered an originating communication device.

In one arrangement, the communication device 104 can determine whether it is desirable to communicate adaptive data packets 108 to the communication device 106. For instance, the communication device 104 can determine whether the amount of data to be communicated to the communication device 106 will exceed the maximum amount of data that normally would be contained in single packet. The communication device 104 also can process other parameters to determine whether it is desirable to communicate adaptive data packets 108. For example, the communication device 104 can receive parameters indicating present RF conditions, such as reverse activity bit (RAB), data rate control (DRC), packet error rate (PER), carrier to interference ratio (C/I), pilot signal energy to interference ratio (Ec/Io), packet size (PS), and so on. The communication device 104 also can receive parameters indicating bearer delay/jitter feedback observed by communication device 106 for packets previously communicated, for instance using application level feedback corresponding to RTP Control Protocol (RTCP) based frames received by the communication device 106.

For this example, assume that the maximum packet size is $2^{10}$ (i.e. 1024) bits. If the communication device 104 is communicating application data, such as PTT voice data encoded with a half-rate enhanced variable rate codec (half-rate EVRC) in accordance with Data Only revision A (DOrA), the application data typically would be bundled into six (6) half-rate frames which each contain eighty (80) bits of application data (e.g. data payload), for a total amount of application data of four hundred and eighty (480) bits. An additional three hundred and forty-four (344) bits may be allocated for overhead (e.g. headers, footers, etc.), thus providing a total bit length of eight hundred and twenty-four (824) bits. If it is anticipated that the amount of application data will exceed eight hundred and twenty-four (824) bits, the communication device 104 can determine that it would be desirable to communicate the application data in the adaptive data packets 108 based on one or more parameters, such as those previously described.

If it would be desirable to communicate application data to the communication device 106 using adaptive data packets 108, the communication device 104 can communicate an adaptive data packet request (hereinafter "request") 112 to the communication device 106 and/or the PTT server 110 requesting whether the communication device 106 and/or the PTT server 110 is configured to process the adaptive data packets 108. In one arrangement, the request 112 can be sent after call setup between the communication device 104 and the communication device 106 has been completed. In another arrangement, the request 112 can be communicated from the communication device 104 to the communication device 106 and/or the PTT server 110 prior to the communication device 104 receiving the data to be communicated. For example, the request 112 can be automatically communicated during initialization of a communication session, for example during call setup or at another suitable time.

The communication device 106 and/or the PTT server 110 can respond to the request 112 with an adaptive data packet indicator (hereinafter "indicator") 114 that indicates whether the communication device 106 and/or the PTT server 110 is suitably configured to process the adaptive data packets 108. In this case, the indicator can be considered a response or acknowledgement. If the indicator 114 indicates that the communication device 106 and/or the PTT server 110 is suitably configured to process adaptive data packets 108, then the communication device can select to communicate adaptive data packets 108 to the communication device 106. If the indicator 114 indicates that the communication device 106 and/or the PTT server 110 is not suitably configured to process adaptive data packets 108, or an indicator 114 is not received, then the communication device can select to communicate conventional data packets to the communication device 106.

Alternatively, in lieu of responding to requests 112, the communication device 104, communication device 106 and/or the PTT server 110 can automatically generate indicators 114 (which may be included in messages, but not necessarily be responses) during initialization of a communication session to indicate whether the respective devices 104, 106, 110 are configured to process adaptive data packets 108. Again, such messages can be generated during call setup, or at any other suitable time.

If the communication device 104 receives a response 114 or other suitable message indicating that the communication device 106 and/or the PTT server 110 is configured to process adaptive data packets 108, then the communication device 104 can communicate application data to the communication device 106 by encoding the application data into adaptive data packets 108. As noted, the application data to be communicated can include PTT data.

FIG. 2 depicts an adaptive data packet 108 that is useful for understanding the present invention. In this example, the adaptive data packet 108 may be encoded for use with DOrA, in which case the adaptive data packet 108 can include a fixed number (e.g. six) of frames 202, 204, 206, 208, 210, 212 and overhead data 214. The invention is not limited in this regard, however, and the adaptive data packet 108 can be encoded for use with any other suitable standard. Examples of such standards include, but are not limited to, 1x Evolution Data Optimized revision B (DOrB), General Packet Radio Service (GPRS), Enhanced Data rates for GSM Evolution (EDGE), High Speed Packet Access (HSPA), Long Term Evolution (LTE), and Mobile WiMAX, which is based upon IEEE Std 802.16e.

The bit length of the adaptive data packet 108 can be any suitable packet bit length, for instance in accordance with the C.S0024-A standard proposed by Third Generation Partnership Project 2 (3GPP2). For this example, the bit length of the adaptive data packet 108 is selected to be one thousand and twenty-four (1024) bits, but other packet sizes can be used.

Notably, the bit length of each of the frames 202-212 within the adaptive data packet 108 need not be the same. In the case that the adaptive data packet 108 is being used to communicate application data, for example, one or more of the frames 202-212 can be half-rate enhanced variable rate codec (half-rate EVRC) frames that have a bit length suitable for carrying eighty (80) bits of application data (e.g. data payload), and one or more of the frames 202-212 can be full-rate EVRC frames that have a bit length suitable for carrying one hundred and seventy-one (171) bits of application data. For instance, frames 202, 204, 208, 210 can be half-rate EVRC frames and frames 206, 212 can be full-rate EVRC frames. The full-rate EVRC frames 206, 212 can be interleaved among the half-rate EVRC frames 202, 204, 208, 210 in any desired order.

A respective segment of the application data, or data payload, can be encoded into each of the respective frames 202-212. For instance, a data segment comprising a first eighty (80) bits of the application data can be encoded into the frame 202, a data segment comprising a next eighty (80) bits of the application data can be encoded into the frame 204, and a data segment comprising a next one hundred and seventy-one (171) bits of application data can be encoded into the frame 206. Proceeding further, a following data segment of eighty (80) bits of the application data can be encoded into the frame 208, a data segment comprising a next eighty (80) bits of the application data can be encoded into the frame 210, and a data segment comprising a next one hundred and seventy-one (171) bits of application data can be encoded into the frame 212. Accordingly, in this example, a total of six hundred and sixty-two bits of application data can be encoded into the adaptive data packet 108. As used herein, a "data segment" is a portion or sub-portion of data contained within a bitstream of application data.

In one arrangement the frames can be placed in the adaptive data packet 108 such that the half-rate EVRC frames 202, 204 are followed by the full-rate EVRC frame 206, which is followed by two more half-rate EVRC frames 208, 210. The final EVRC frame in the packet then can be the full-rate EVRC frame 212.

In another arrangement, the full-rate EVRC frame 206 can be the first EVRC frame in the adaptive data packet 108, followed by the half-rate EVRC frames 202, 204. The full-rate EVRC frame 212 then can be included in the adaptive data packet 108, followed by the half-rate EVRC frames 208, 210.

In yet another arrangement, the frames 202-212 within the adaptive data packet 108 can be placed in the following order: half-rate EVRC frame 202, full-rate EVRC frame 206; half-rate EVRC frame 204; half-rate EVRC frame 208, full-rate EVRC frame 212; half-rate EVRC frame 210. Still, the frames 202-212 can be placed in the adaptive data packet 108 in any other desired order and the invention is not limited in this regard.

Moreover, the overhead data 214 can be distributed within the adaptive data packet 108 and among the successive frames 202-212 for use as headers, footers, etc. Further, any unused bits 216 in the adaptive data packet 108 may be positioned within the adaptive data packet 108 as desired. For example, the unused bits 216 can be placed before a packet header, after a packet header, before a packet footer, after a packet footer, distributed between the frames 202-212, or positioned within the adaptive data packet 108 in any other desired manner.

Notably, by including both half-rate EVRC frames 202, 204, 208, 210 and full-rate EVRC frames 206, 212 within the adaptive data packet 108, the number of unused bits 216 can be minimized. For instance, if each half-rate EVRC frame 202, 204, 208, 210 comprises eighty (80) bits of application data (e.g. data payload), and each full-rate EVRC frame 206, 212 comprises one hundred and seventy-one (171) of bits of application data, the total amount of application data that may be contained in the frames 202-212 is six hundred and sixty-two (662) bits. If we assume that the overhead 214 comprises three hundred and forty-four (344) bits, then the total amount of application data contained within the adaptive data packet 108 is one-thousand and six (1006) bits.

Accordingly, whereas a conventional DOrA one thousand and twenty-four (1024) bit data packet typically carries two-hundred (200) unused bits, the number of unused bits 216 in the adaptive data packet 108 can be reduced to eighteen (18) bits. Thus, configuring the adaptive data packet 108 in accordance with the inventive arrangements described herein enables the adaptive data packet 108 to carry a greater amount of application data than a conventional DOrA data packet, thus increasing packet efficiency.

Furthermore, for a PTT call, the amount of voice data that is communicated can be increased for a given amount of bandwidth, which can improve the quality of voice signals that are communicated. For instance, the full-rate EVRC frames 206, 212 can be encoded with a significantly higher amount of audio detail. When the full-rate EVRC frames 206, 212 are strategically placed within the adaptive data packet 108, the overall quality of audio signals being communicated in the adaptive data packet 108 will be improved in comparison to audio signals communicated in a conventional DOrA packet.

The additional amount of application data that can be carried in the adaptive data packets 108 also can be used to communicate presence information that indicates a presence state, for example a user's current availability, and so on. Such presence information can be occasionally included in the adaptive data packet 108 in place of any remaining unused bits. The presence information can be included in the adaptive data packet 108 in response to a corresponding user input or in response to a change being applied to the presence information. The presence information also can be included in the adaptive data packet 108 at a periodic interval.

Continuing with the previous example, the presence information can be included in the adaptive data packet 108 in lieu of one or more of the eighteen (18) unused bits. If a greater number of bits are required to carry the presence information, then a fewer number of full-rate EVRC frames 206, 212 can be used in the adaptive data packet 108. For example, in lieu of using two full-rate EVRC frames 206, 212 and four half-rate EVRC frames 202, 204, 208, 210, one full-rate EVRC frame 206 and five half-rate EVRC frames can be included in the adaptive data packet 108, thereby providing one hundred and nine (109) otherwise unused bits that are available to carry the presence information.

Figure 3:
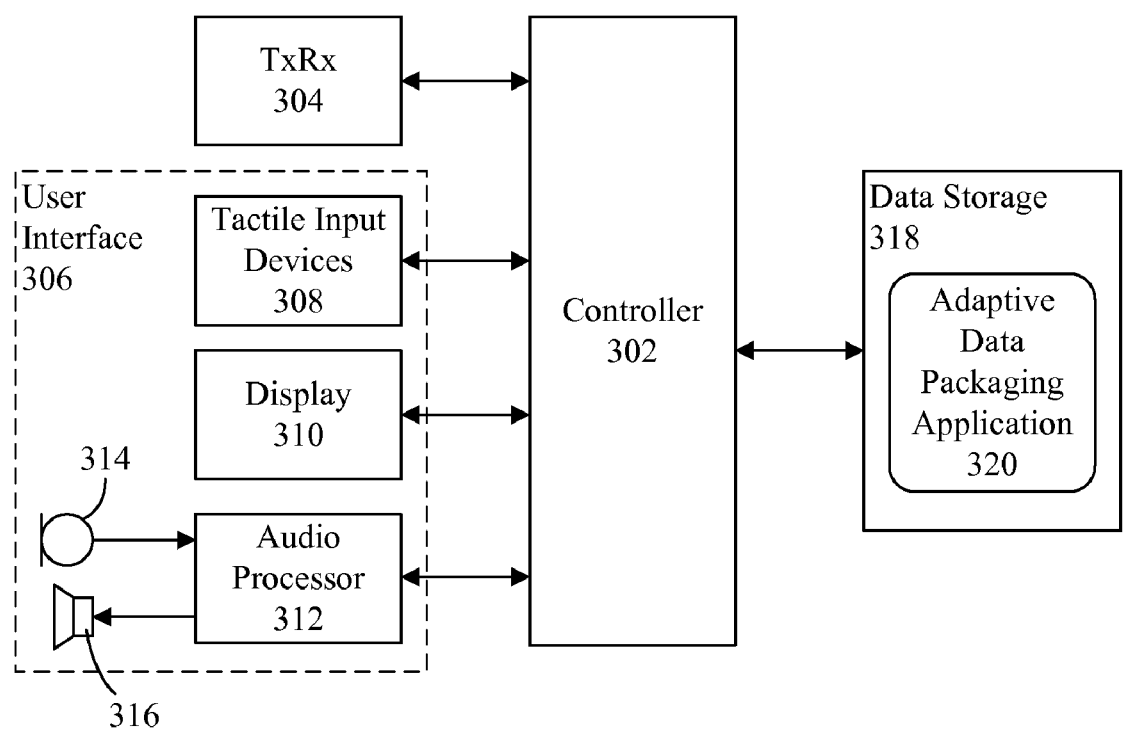
FIG. 3 depicts a block diagram of a PTT communication device that is useful for understanding the present invention.

FIG. 3 depicts a block diagram of a communication device 104 that is useful for understanding the present invention. The communication device 104 can be, for example, a PTT communication device. The communication device 104 can include a controller 302, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The communication device 104 also can include a transceiver 304. The transceiver 304 can modulate and demodulate signals to convert signals from one form to another, and can transmit and/or receive such signals over one or more various wireless communication networks. For example, the transceiver 304 can be configured to transmit and receive adaptive data packets.

In illustration, the transceiver 304 can be configured to communicate data via IEEE 802 wireless communications, for example, 802.11 and 802.16 (WiMax), WPA, or WPA2. In another example, the transceiver 304 can communicate data via TDMA, CDMA, WCDMA, GSM, GPRS, UTMS, 3G, 4G, EUTRAN, UMB, OFDM, LTE, etc. Further, the transceiver 304 also can be configured to communicate over a wireless communication link using any of a myriad of packet-based communication protocols, for example, TCP/IP.

The communication device 104 further can include a user interface 306. The user interface 306 also can comprise one or more tactile input devices 308, for example one or more buttons, keys, soft keys, sensors, or any other devices suitable for receiving a tactile user input and communicating the tactile user input to the controller 302. Optionally, the user interface 306 also can include a display 310. In one arrangement, the display 310 can comprise a touch screen that can receive tactile and/or stylus inputs and communicate such inputs to the controller 302.

The user interface 306 further can include an audio processor 312 connected to an input audio transducer 314 (e.g. microphone) and an output audio transducer 316 (e.g. loudspeaker). The audio processor 312 can comprise a CPU, a DSP, an ASIC, a PLD, a plurality of discrete components that cooperate to process audio data, and/or any other suitable processing device. The audio processor 312 can be integrated with the controller 302 or provided as a separate component that is communicatively linked to the controller 302.

The audio processor 312 can receive output audio signals from the controller 302 and communicate such signals to the output audio transducer 316. Similarly, the audio processor 312 can receive input audio signals from the input audio transducer 314 and communicate such signals to the controller 302. The audio processor 312 can comprise, for example, a vocoder that analyzes and synthesizes such signals.

Further, additional devices (not shown) can be components of the user interface 306. For instance, the user interface 306 also can include a headset, a speakerphone, or other device(s) communicatively linked to the communication device 104 via the transceiver 304, a second transceiver (not shown), and/or a communications port (not shown).

The communication device 104 further can include a data storage 318 communicatively linked to the controller 302. The data storage 318 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 318 can be integrated into the controller 302, though this need not be the case.

An adaptive data packaging application 320 can be stored on the data storage 318 or otherwise made accessible to the controller 302. The adaptive data packaging application 320 can be executed by the controller 302 to implement the methods and processes described herein that are performed by the communication device 104. For example, the controller 302 can execute the adaptive data packaging application 320 to determine whether data should be communicated using adaptive data packets, inquire whether other devices (e.g. a terminating communication device and/or a PTT server) are suitably configured to encode data to be communicated into adaptive data packets, receive responses to such inquiry, receive parameters regarding conditions of communication links over which the data is to be communicated, encode data to be communicated into adaptive data packets, outputs the adaptive data packet, and so on.

Figure 4:
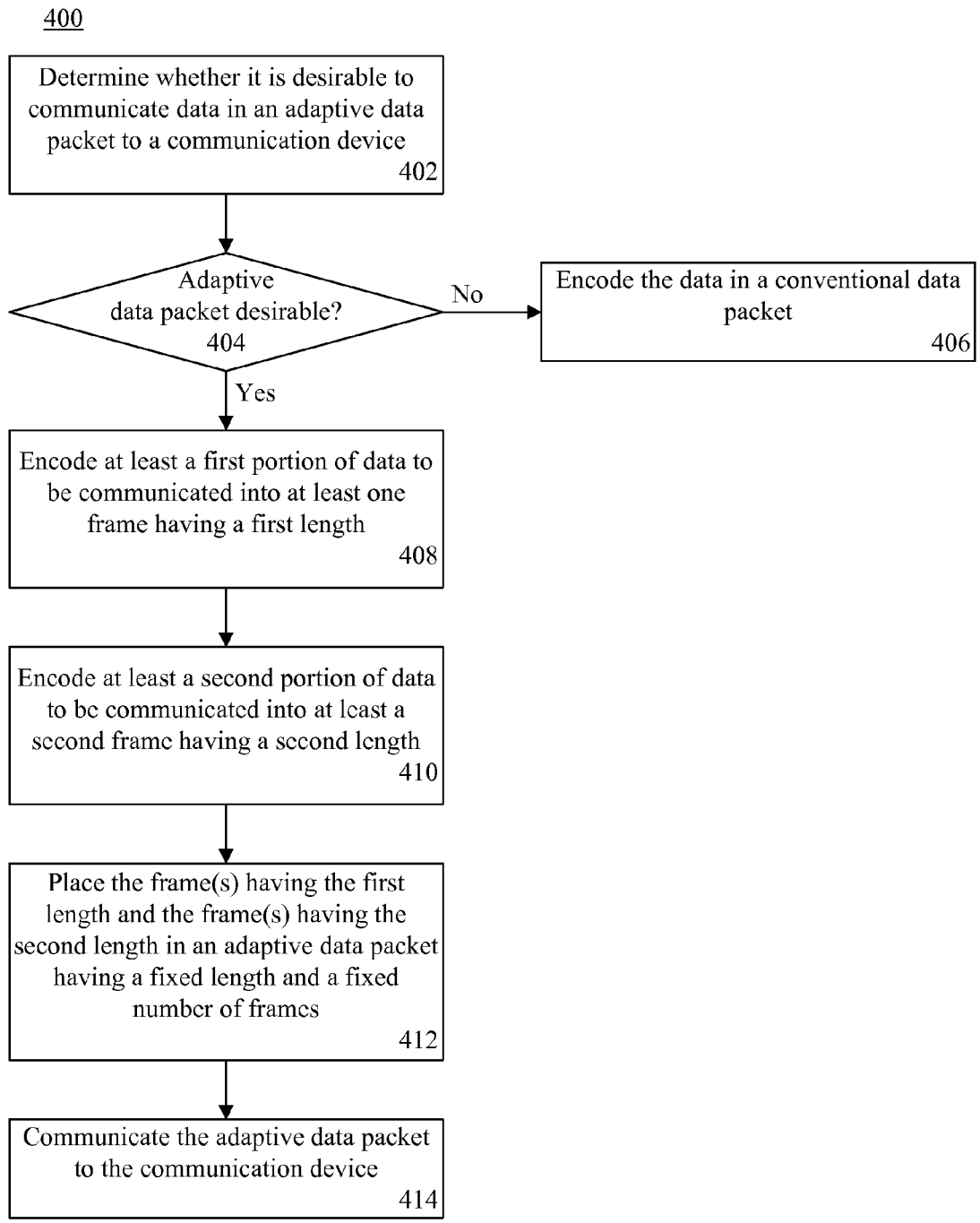
FIG. 4 is a flowchart that is useful for understanding the present invention.

FIG. 4 is a flowchart presenting a method 400 of communicating data that is useful for understanding the present invention. At step 402, a determination can be made whether it is desirable to communicate an adaptive data packet to a communication device. For example, in one arrangement, an adaptive data packet request can be communicated to the communication device and/or a PTT server. An indicator in response to the adaptive data packet request then can be received from the communication device and/or the PTT server to indicate whether the communication device and/or the PTT server is suitably configured to process adaptive data packets. If no response to the adaptive data packet request is received, it can be assumed that adaptive data packets are not desirable. In another arrangement, an indicator that indicates whether the communication device and/or the PTT server is suitably configured to process adaptive data packets can be received during call setup, in which case the adaptive data packet request need not be required.

Referring to decision box 404, if it is determined that it is not desirable to communicate data to the communication device in an adaptive data packet, at step 406 the data to be communicated to the communication device can be encoded in a conventional data packet. If, however, it is determined that it is desirable to communicate data to the communication device in an adaptive data packet, the method 400 can continue to step 408.

At step 408, at least a first portion of data to be communicated to the communication device can be encoded into at least one frame having a first bit length. For example, a first plurality of data segments can be encoded into respective frames each having the first bit length. At step 410, at least a second portion of data to be communicated to the communication device can be encoded into at least one frame having a second bit length. For example, a second plurality of data segments can be encoded into respective frames each having the second bit length.

Moreover, the frames having the second bit length can be interleaved among the frames having the first bit length. For instance, a first frame, a second frame, a third frame and a fourth frame, each having the first bit length, can be placed into the adaptive data packet. Further, a fifth frame and a sixth frame, each having the second bit length, can be placed into the adaptive data packet. In one particular arrangement, the fifth frame can be placed between the second frame and the third frame, and the sixth frame can be placed after the fourth frame.

At step 412, the frame(s) having the first bit length and the frame(s) having the second bit length can be placed into an adaptive data packet having a fixed bit length and a fixed number of frames. At step 414, the adaptive data packet can be communicated to the communication device.

As used herein, for example in the description of the method 400 and in the claims, the ordinal terms (e.g. first, second, third, fourth, fifth, sixth, seventh, eighth, ninth, tenth, and so on) distinguish one segment, frame or group of segments or frames from another segment, frame or group of segments or frames. Thus, an ordinal term used herein need not indicate a specific position in an ordinal series. For example, a frame identified as a "fifth frame" may occur before a frame identified as a "third frame."

Further, the use of ordinal terms to distinguish the frames or groups of frames from one another need not indicate that such frames correspond to specific portions of data to be communicated. For instance, a first portion of data may comprise non-successive segments of data. By way of example, a first portion of the data may comprise one segment of data represented by bit positions 20-100 of a data stream, another segment of data represented by bit positions 148-228 of the data stream, another segment of data represented by bit positions 532-612 of the data stream, and another segment of data represented by bit positions 660-740 of the data stream. Similarly, a second portion of the data may comprise one segment of data represented by bit positions 296-467 of the data stream, and another segment of data represented by bit positions 780-951 of the data stream. It should be noted that arbitrary positions of data have been selected for this example, and the invention is not limited in this regard.

Moreover, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of communicating data, comprising:
   encoding at least a first portion of the data into at least one frame having a first bit length;
   encoding at least a second portion of the data into at least one frame having a second bit length;
   placing the at least one frame having the first bit length and the at least one frame having the second bit length into an adaptive data packet having a fixed bit length and a fixed number of frames; and
   communicating the adaptive data packet to a communication device.

2. The method of claim 1, wherein encoding the first portion of the data into the at least one frame having the first bit length comprises:
   encoding the first portion of data into a half-rate enhanced variable rate codec (half-rate EVRC) frame.

3. The method of claim 1, wherein encoding the at least one frame having the second bit length comprises:
   encoding the second portion of data into a full-rate enhanced variable rate codec (full-rate EVRC) frame.

4. The method of claim 1, wherein:
   encoding at least the first portion of the data into the at least one frame having the first bit length comprises encoding a first plurality of data segments into respective frames each having the first bit length; and
   encoding at least the second portion of the data into the at least one frame having the second bit length comprises encoding a second plurality of data segments into respective frames each having the second bit length.

5. The method of claim 4, wherein placing the at least one frame having the first bit length and the at least one frame having the second bit length into the adaptive data packet comprises:
　interleaving the frames having the second bit length among the frames having the first bit length.

6. The method of claim 5, wherein interleaving the frames having the second bit length among the frames having the first bit length comprises:
　placing a first frame, a second frame, a third frame and a fourth frame, each having the first bit length, into the adaptive data packet; and
　placing a fifth frame and a sixth frame, each having the second bit length, into the adaptive data packet.

7. The method of claim 6, wherein interleaving the frames having the second bit length among the frames having the first bit length comprises:
　placing the fifth frame between the second frame and the third frame; and
　placing the sixth frame after the fourth frame.

8. The method of claim 1, further comprising:
　determining whether it is desirable to communicate the data in the adaptive data packet to the communication device.

9. The method of claim 8, wherein determining whether it is desirable to communicate the data in the adaptive data packet comprises:
　communicating an adaptive data packet request to at least one device selected from a group consisting of the communication device and a push-to-talk (PTT) server.

10. The method of claim 9, further comprising:
　receiving from at least one device selected from the group consisting of the communication device and a push-to-talk (PTT) server an adaptive data packet indicator in response to the adaptive data packet request.

11. The method of claim 8, wherein determining whether it is desirable to communicate the data in the adaptive data packet comprises:
　receiving a data packet indicator from at least one device selected from a group consisting of the communication device and a push-to-talk (PTT) server during call setup.

12. A communication device, comprising:
　a controller that:
　　encodes at least a first portion of the data into at least one frame having a first bit length;
　　encodes at least a second portion of the data into at least one frame having a second bit length;
　　places the at least one frame having the first bit length and the at least one frame having the second bit length into an adaptive data packet having a fixed bit length and a fixed number of frames; and
　　outputs the adaptive data packet.

13. The communication device of claim 12, wherein:
the controller encodes the first portion of data into a half-rate enhanced variable rate codec (half-rate EVRC) frame.

14. The communication device of claim 12, wherein:
the controller encodes the second portion of data into a full-rate enhanced variable rate codec (full-rate EVRC) frame.

15. The communication device of claim 12, wherein:
the controller encodes a first plurality of data segments into respective frames each having the first bit length; and
the controller encodes a second plurality of data segments into respective frames each having the second bit length.

16. The communication device of claim 15, wherein:
the controller interleaves the frames having the second bit length among the frames having the first bit length.

17. The communication device of claim 16, wherein:
the controller places a first frame, a second frame, a third frame and a fourth frame, each having the first bit length, into the adaptive data packet; and
the controller places a fifth frame and a sixth frame, each having the second bit length, into the adaptive data packet.

18. The communication device of claim 17, wherein:
the controller places the fifth frame between the second frame and the third frame; and
the controller places the sixth frame after the fourth frame.

19. The communication device of claim 12, wherein:
the controller determines whether it is desirable to communicate the data in the adaptive data packet to the communication device.

20. A computer program product comprising:
a computer-usable storage device comprising computer-usable program code that communicates data, the computer-usable storage device comprising:
computer-usable program code that encodes at least a first portion of the data into at least one frame having a first bit length;
computer-usable program code that encodes at least a second portion of the data into at least one frame having a second bit length;
computer-usable program code that places the at least one frame having the first bit length and the at least one frame having the second bit length into an adaptive data packet having a fixed bit length and a fixed number of frames; and
computer-usable program code that outputs the adaptive data packet.

\* \* \* \* \*